E. DUERR.
EGG CARRIER.
APPLICATION FILED JUNE 9, 1914.
1,128,117.
Patented Feb. 9, 1915.
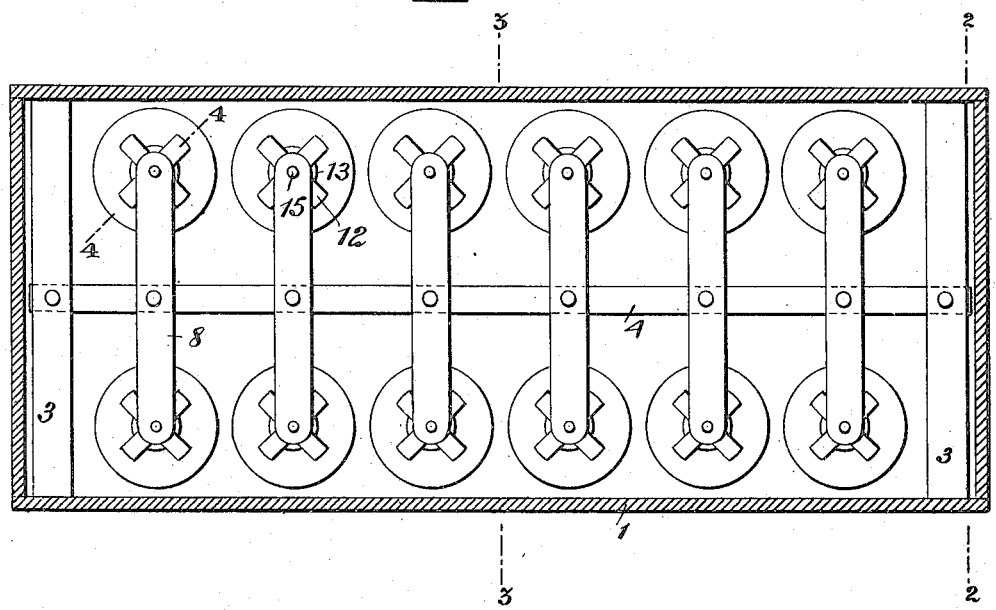
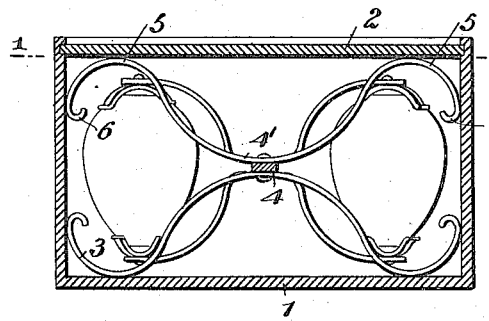
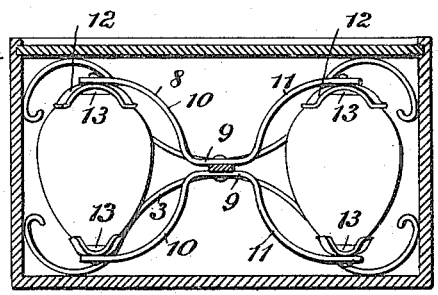
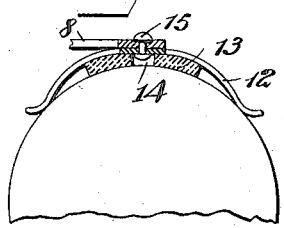
WITNESSES
H. J. Walker
A. L. Kitchin
INVENTOR
Eugene Duerr
BY Munn & Co
ATTORNEYS

UNITED STATES PATENT OFFICE.

EUGENE DUERR, OF NEW YORK, N. Y.

EGG-CARRIER.

1,128,117.       Specification of Letters Patent.       Patented Feb. 9, 1915.

Application filed June 9, 1914. Serial No. 843,994.

*To all whom it may concern:*

Be it known that I, EUGENE DUERR, a citizen of the United States, and a resident of the city of New York, borough of Brooklyn, county of Kings, and State of New York, have invented a new and Improved Egg-Carrier, of which the following is a full, clear, and exact description.

This invention relates to improvements in egg carriers, and has for an object to provide an improved structure which will resiliently support eggs in a container.

Another object of the invention is to provide a resilient support for eggs which will hold the eggs spaced apart and will press against the ends of the eggs, whereby the strain on the eggs is brought at their strongest point.

In carrying out the objects of the invention a suitable box or container is provided in which is arranged a plurality of spring supporting members for supporting a comparatively stiff bar. Connected with this bar are bowed spring supports which have egg engaging members arranged on the ends for engaging the ends of eggs and holding the same spaced from the top and bottom as well as from the sides of the container.

In the accompanying drawings—Figure 1 is a section through Fig. 2 on line 1—1; Fig. 2 is a transverse section through the showing in Fig. 1, the same being taken on line 2—2; Fig. 3 is a section through Fig. 1 on line 3—3; Fig. 4 is an enlarged detailed fragmentary sectional view through Fig. 1 approximately on line 4—4.

Referring to the accompanying drawings by numeral, 1 indicates a container of any desired construction provided with a removable top or lid 2 which is preferably slidingly fitted into the container 1 as shown in Fig. 2. A pair of springs 3 are arranged at each end of container 1 as shown in Fig. 1, which springs support a comparatively stiff bar 4. The springs 3 are of the shape shown more clearly in Fig. 2, namely, with substantially semi-circular sections 4′ merging into reverse semi-circular sections 5 of less diameter than sections 4′, which reverse sections merge into coils 6 and 7. The ends adjacent the coils 6 and 7 are designed to press against the side walls of casing 1, while the sections 5 are designed to press against the top 2 and against the bottom of the casing 1, whereby the bar 4 is resiliently held in a central position.

Arranged along bar 4 are a plurality of pairs of spring members 8, as more clearly seen in Fig. 3. The pairs of springs 8 are each provided with a central section 9 and arm shaped sections 10 and 11. Sections 10 and 11 carry at their outer ends egg engaging members 12 which appear as crosses from the top as shown in Fig. 1, but which are cupped as shown more particularly in Figs. 3 and 4, the extreme ends of the portions or arms of the cross being curved as shown in Fig. 4. Arranged in the bottom of each of the members 12 is a washer 13 having a central aperture 14 opposite the rivet 15 or other connecting member which connects the members 12 with the springs 8. The members 12 are designed to engage the ends of the eggs as clearly shown in Figs. 2 and 3. In order to prevent the securing member or rivet 15 from injuring the egg and also for providing a more even distribution of strain washer 13 is provided, which washer is formed of rubber or other resilient material. It is well known that an egg will resist a greater pressure when the same is exerted on its major axis instead of on a transverse axis or on any other line. In forming the present invention advantage has been taken of this fact and means have been provided for engaging and resiliently pressing the egg along the line of its greatest resistance, whereby the egg can be properly suspended in the air. By spacing the eggs apart as shown in Fig. 1, and suspending the same independently in the air each egg is in a certain sense independently crated. When there is a jolt or jar on the container the springs 3 will first act and then the springs 8.

What I claim is—

1. In an egg carrier of the class described, a casing, a centrally arranged supporting bar, a pair of springs connected with said supporting bar arranged at each end of the casing, whereby any movement of the supporting bar is resiliently resisted, a plurality of auxiliary spring members mounted on said supporting bar, and means for supporting eggs on said auxiliary spring members.

2. In an egg carrier of the class described, a casing, a pair of springs arranged in each end of said casing, each of said springs being coiled at the end so as to slidingly engage the top and bottom of the casing and the sides, a stiff bar connecting the springs at one end with the springs at the opposite end whereby said bar is resiliently supported in the casing, a plurality of pairs of spaced auxiliary springs connected with said bar, and means for supporting an egg on each end of each pair of auxiliary springs.

3. In an egg carrier of the class described, a casing, a main bar arranged in the casing, resilient supporting means arranged at each end of said bar, said supporting means engaging the top, bottom and sides of the casing, and means for resiliently mounting a plurality of eggs on said bar.

4. In an egg carrier of the class described, a casing, a main bar arranged in said casing, resilient supporting means arranged adjacent each end of said bar, a plurality of spaced pairs of springs connected with said bar, said springs having diverging arms on each side of said bar for receiving an egg therebetween, whereby each pair of springs supports two eggs, and a retaining member on each arm of each of said springs for partially fitting over said eggs, whereby the same are supported by said springs.

5. In an egg carrier of the class described, a casing, a bar arranged in said casing, resilient supporting means for said bar, a pair of springs connected with said bar provided with diverging arms, and means arranged on each of said arms for causing each pair of arms to support an egg whereby there are two eggs supported by each pair of springs.

6. In an egg carrier of the class described, a casing, a bar arranged in said casing, resilient means for supporting said bar, a pair of springs connected with said bar provided with diverging arms at each end, means for supporting an egg in each pair of diverging arms, and a cushioning washer arranged in each of said means, whereby the pressure from said arms is more evenly distributed to the ends supported by the arms.

In testimony whereof I have signed my name to this specification in the presence of two subscribing witnesses.

EUGENE DUERR.

Witnesses:
PHILIP WEISER,
JOHN N. LANG.

Copies of this patent may be obtained for five cents each, by addressing the "Commissioner of Patents, Washington, D. C."